Nov. 29, 1938.   R. K. METCALF   2,138,010
SPONGE RUBBER BRUSH
Filed Jan. 31, 1938
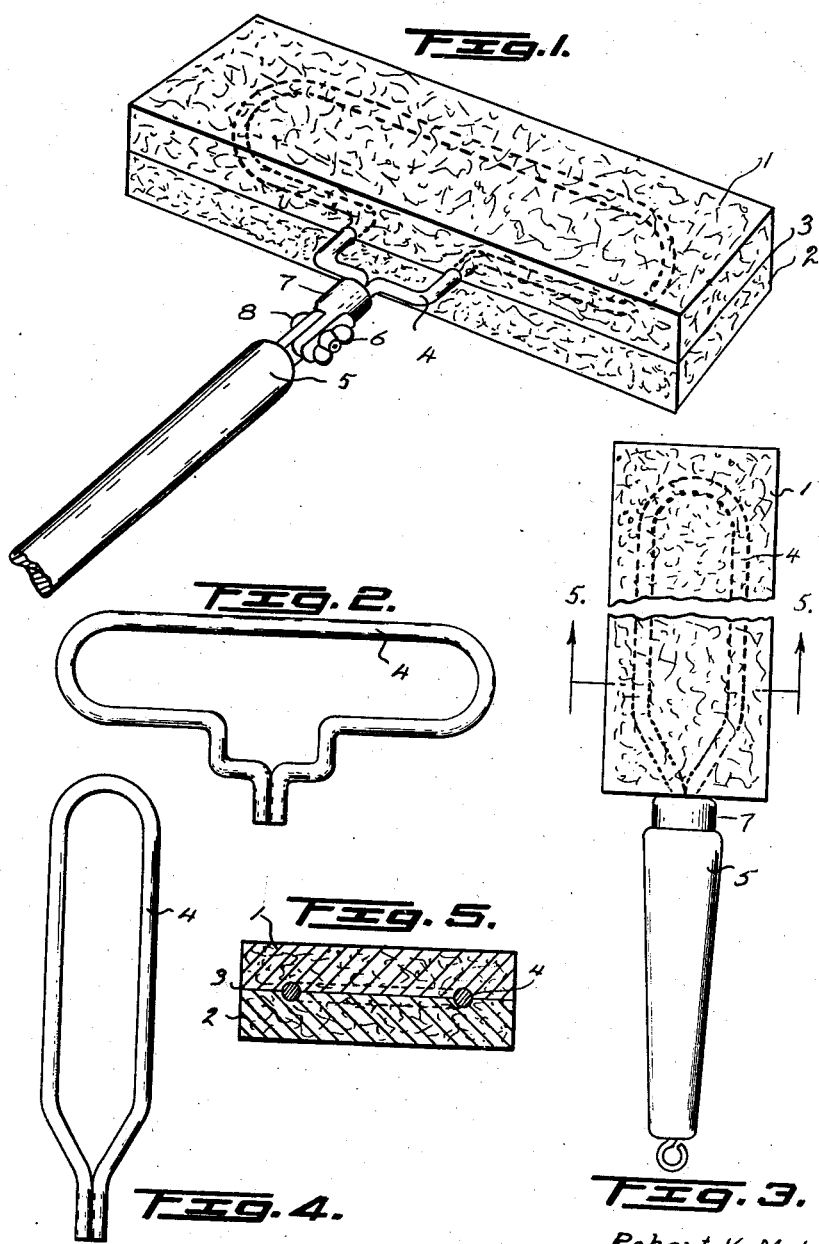
Robert K. Metcalf
INVENTOR
ATTORNEY Patented Nov. 29, 1938

2,138,010

UNITED STATES PATENT OFFICE 2,138,010

SPONGE RUBBER BRUSH

Robert K. Metcalf, Toronto, Ontario, Canada

Application January 31, 1938, Serial No. 187,879

1 Claim. (Cl. 15—244)

My invention relates to a new and useful article of manufacture comprising a sponge rubber brush constructed and reinforced in a manner to permit its use for cleaning wallpaper, painted walls, clothing and the like.

The use of sponge rubber is well known and with the developments in the manufacture of sponge rubber, which substantially reproduces the properties of the natural sponge, its use has become extremely wide spread. It has not been commercially practical, however, to use sponges or sponge rubber where it is necessary to apply pressure or where there is friction between the sponge and the article being cleaned, particularly in view of the fact that the sponge rubber tends to hold no definite shape and also tends to disintegrate.

One of the objects of my invention is to provide a reinforced sponge rubber brush which retains its shape and utility when pressure is exerted on the handle thereof, and by means of which it is suitable for such purposes as cleaning wallpaper, painted walls, floors, clothing and the like.

A further object of my invention is to provide a reinforcing member which holds the sponge rubber in its predetermined shape and, at the same time, permits the manufacture and sale of the complete brush at a lower cost than heretofore has been considered possible to realize.

These and further objects of my invention and the manner in which I attain them will be clearly understood from the following description and accompanying drawing in which like reference characters refer to like parts throughout.

Figure 1 is a perspective view of a modification of my invention showing a sponge rubber brush adapted for cleaning wallpaper, painted walls and the like.

Figure 2 is a top plan view of the reinforcing member used in the modification shown in Figure 1.

Figure 3 is a side elevation of a modification of my invention showing a sponge rubber brush adapted for cleaning clothes.

Figure 4 is a top plan view of the reinforcing member used in the brush shown in Figure 3.

Figure 5 is a cross sectional view taken along the line 5—5, Figure 3.

In the preferred embodiments of my invention shown in Figures 1 to 5 inclusive, the numerals 1 and 2 refer to the sponge rubber blocks which provide the cleaning surfaces. The blocks 1 and 2 are formed entirely of sponge rubber except for a thin film or skin 3 on one face thereof.

The reinforcing member 4 is formed of rigid material, preferably rust-resistant and rounded in such a manner that no cutting edges are exposed to the sponge rubber. I have found that a steel rod, treated as to be rust-resistant, having a diameter of about one quarter of an inch is very satisfactory and may be readily bent to form the desired shape. The reinforcing member 4 is formed in substantially the same shape as the sponge rubber blocks 1 and 2 but slightly smaller both as to length and width.

The reinforcing member 4 is shaped in such a manner that the ends thereof extend outwardly relatively close together in which position they may be readily inserted into the lower end of the handle 5. The member 4 may also be suitably scored, if desired, to hold the sponge rubber blocks 1 and 2 in more close fitting engagement therewith.

The brush is formed by coating the thin rubber film 3 of each sponge rubber block with a cold vulcanizing compound. The reinforcing member is placed in position on the film 3 of one block and the two blocks are brought together with the thin rubber films 3 contacting each other. The blocks are pressed together during the setting of the vulcanizing compound.

The design of the handle 5 may be varied, of course, to conform with the particular adaptations of the brush. In the larger designs suitable for cleaning wall paper, floors and the like, I prefer to have the handle adjustable by means of the thumb screw 6. In this instance, the ends of the reinforcing member 4 are inserted into the socket 7. The handle 5 is secured to the socket 7 by means of the bolt 8 and, on tightening the wing nut 6, is held firmly in its fixed position. It will be apparent, of course, that any one of a number of known means may be applied to enable adjusting the angle between the brush and the handle. It is usually desirable, however, to have the angle between the brush handle and the brush adjustable in order that the normal wear on the brush shall not always be on the same surface.

In the alternative construction shown in Figure 3, the ends of the reinforcing member 4 are inserted into the socket 7 which forms the lower part of the handle 5.

I have found that my brush may be manufactured and distributed at a very low cost. It is extremely useful inasmuch as full advantage may be taken of the desirable properties of sponge rubber and the undesirable properties which heretofore have limited its uses have been overcome by my reinforcing member and the manner in which I assemble the various component parts.

Having thus fully described my invention, what I claim as new and desire to secure by Letters Patent is:

A scrubbing and brushing implement, comprising two similar rectangular sponge rubber blocks adhesively secured together, a rigid reinforcing member inserted therebetween, said reinforcing member consisting of rigid material of substantially the same shape as, but slightly smaller than the sponge rubber blocks and located approximate to the periphery of said blocks, said reinforcing member extending outside at an edge of the sponge rubber blocks to form a connection with a handle.

ROBERT K. METCALF.